(12) United States Patent
Iacobovici

(10) Patent No.: US 7,555,692 B1
(45) Date of Patent: Jun. 30, 2009

(54) END-TO-END RESIDUE BASED PROTECTION OF AN EXECUTION PIPELINE

(75) Inventor: Sorin Iacobovici, San Jose, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 623 days.

(21) Appl. No.: 11/135,982

(22) Filed: May 24, 2005

Related U.S. Application Data

(60) Provisional application No. 60/627,817, filed on Nov. 15, 2004.

(51) Int. Cl.
G06F 11/30 (2006.01)
G08C 25/00 (2006.01)
H03M 13/00 (2006.01)

(52) U.S. Cl. .................... 714/746; 708/233

(58) Field of Classification Search .............. 714/746; 708/233
See application file for complete search history.

(56) References Cited

U.S. PATENT DOCUMENTS 4,870,607 A * 9/1989 Ishizuka ............... 708/532
6,519,730 B1 * 2/2003 Ando et al. ............ 714/746

OTHER PUBLICATIONS

U.S. Appl. No. 11/145,397, filed Jun. 3, 2005, and naming as inventor(s) Sorin Iacobovici.
U.S. Appl. No. 11/209,124, filed Aug. 22, 2005, and naming as inventor(s) Sorin Iacobovici.

* cited by examiner

*Primary Examiner*—Guy J Lamarre
(74) *Attorney, Agent, or Firm*—Osha • Liang LLP

(57) ABSTRACT

A processor that protects an execution pipeline includes a residue-based error detection infrastructure including a first logic for computing a first residue of a result of an executed instruction instance, and a second logic for computing a second residue of the result. The second logic applies arithmetic operations of the executed instruction instance to residues of operands of the instruction instance. The execution pipeline includes registers and one or more arithmetic execution units. A method of protecting an execution pipeline includes performing one or more operations of an instruction instance on residues of operands of the instruction instance, computing a first residue of a result of the operations on the operand residues, computing a second residue from a result of executing the instruction instance, and checking the first residue against the second residue to determine whether errors were introduced while the instruction instance was resident in the execution pipeline.

17 Claims, 5 Drawing Sheets

END-TO-END RESIDUE BASED PROTECTION OF AN EXECUTION PIPELINE

BACKGROUND

1. Field of the Invention

The invention relates to error detection and, in particular, residue-based error detection.

2. Description of the Related Art

With computers being part of every day life and critical for business, the microprocessors' reliability is a critical design requirement. This reliability, usually expressed as MTBF (Mean Time Between Failures), indicates both the error rate of the microprocessor and the capability of the microprocessor to survive many of these errors. Processor errors can be classified into two categories: 1) soft or transient errors and 2) hard or permanent errors. The error rate is reported in FITs (failures in time), where one FIT specifies one failure in a billion hours of operation. As a frame of reference, a FIT rate of 114,000 FIT for a component (a microprocessor, for example) indicates that the component has an MTBF of one year. However, if a company sells 1000 microprocessors to a customer, the microprocessor should have a FIT rate of about 114 FIT in order for that customer to experience an average of one microprocessor failure per year for this lot.

High energy particles from cosmic radiation or alpha particles in packaging materials cause soft errors affecting electronic components. Such radiation events can cause charge collection at sensitive circuit nodes, corrupting those circuit states without causing permanent damage. The radiation events primarily affect storage elements (RAM cells, latches, flip-flops) which hold a state (bit values) for a relatively long time. Radiation events and altitude affect soft error rates of different storage elements. In addition, soft error rates (SER) depend on voltage and circuit characteristics.

Combinatorial logic can be affected if a soft error occurs in the window that would cause the corrupted value to be captured in that logic's latches or flip-flops. For static logic, this window is very narrow and the logic is built with rather large transistors, which can better fight the spurious charge collected due to radiation events. For dynamic logic, the window is wider (equal to the evaluation stage of the logic) and the charge after prefetch is preserved by a half-latch ("keeper" logic). Hence, this logic is significantly more sensitive to radiation events than static logic (although less sensitive than storage elements because of the refresh due to precharge).

Left uncorrected, soft errors induce an error rate which is higher than all other reliability mechanisms. For modern microprocessors, which have large SRAM elements (mostly large caches) and are implemented in deep sub-micron technologies, the error rate, which is dominated by single bit upsets, continues to grow with the increased number of bits in each technology generation. If the single bit upsets in SRAMs are left uncorrected, the reliability (MTBF) of these microprocessors becomes unacceptable. This is the reason why most modern microprocessors implement error detection and correction (EDC) mechanisms (at least) for their caches. These mechanisms are capable of detecting and correcting single bit upsets. It has been observed in chip multi-threading microprocessors that adding EDC to the caches reduces the failure rate due to soft errors (improves MTBF) by over two orders of magnitude. With the single bit upsets for large storage elements out of the way, the failure rate due to soft errors (FRSE) is dominated by the SER of smaller, unprotected storage structures, like register files, buffers and queues etc., as well as the SER of the flip-flops and latches in the microprocessor's logic.

For modern microprocessors that correct single bit upsets in their caches, the hard error rate becomes another significant reliability component. The hard errors, which are the result of either process or manufacturing defects, or of processor wear-out (electromigration, thermal cycling etc.), are becoming more frequent as microprocessors are implemented in ever denser, deep sub-micron technologies. The main reasons for this are increased power densities in transistors and interconnect due to smaller device and interconnect geometries, higher transistor count, power management techniques that might result in thermal cycling, etc. As the hard errors reflect failures in the chip's transistors and interconnect, the hard error rate of a block is proportional with that block's area.

For correctable errors, the error detection mechanisms in a microprocessor usually differentiate between soft and hard errors based on the success of the correction mechanism to recover from the error. All detected errors are, normally, communicated to software by either interrupts (in the case of errors corrected by special hardware mechanisms, as described below) or by traps (in the case of errors corrected by instruction retry initiated by hardware or software). Typically, the software tallies the different errors and, if a certain error occurs more than a preset number of times, then that error is declared a hard error and treated accordingly. The software could also keep track of errors in different components for preventive maintenance, in order to identify and report the components with error rates above an acceptable threshold.

A microprocessor's errors can be classified as a function of the existence of EDC mechanisms for that error. Errors can be classified into the following four main classes:

1. Detected and correctable errors: the error can be detected and the correct value can be recovered. This type of coverage can be achieved by error correction codes (ECC), by parity or residue detection of errors in write-through caches (the parity or residue error forces a miss and, as a result, a refresh of the cache line) or by error detection (parity, ECC, residue, etc.) in storage structures that do not hold architectural state, in logic gates or in flip-flops (if covered). The error correction for these soft errors is done by either hardware or software. In hardware, the error correction is done by either special state machines (e.g. correcting and writing back a dirty line with a single-bit error in a write-back cache before returning the corrected data to the pipeline) or by clearing the pipeline when an instruction with an error tries to commit and re-executing the instructions pending in the pipeline, beginning with the instruction affected by the error. In the case of software correction, the error usually causes a precise trap when the first instruction affected by the errors tries to commit. The trap's service routine can then correct the error using processor hardware that allows it to access the storage elements affected by the error.

2. Detected and uncorrectable errors (DUE errors): the error is detected, but cannot be corrected, resulting, in some systems, in an application or system crash. Parity errors, ECC-detected multi-bit errors in write-back caches, or residue errors in an architectural register are examples of such detected, but uncorrectable errors (at least not correctable by the detecting mechanism).

3. Undetected and unimportant errors: while an error occurred, it affected a structure which is part of speculation, so it does not impact correctness (e.g. a branch predictor). Actually those errors are detected and corrected as part of the normal processor functionality of checking the correctness of the speculation, so the error recovery is indistinguishable from recovering from a wrong speculation.

4. Undetected and uncorrectable errors: an error occurred, but was undetected and caused silent data corruption. These are also known as Silent Data Corruption (SDC) errors. SDC errors can affect the processor state for a significant amount of time without being detected. They are considered the most dangerous type of errors and should be eliminated as much as possible.

Error detection is the most important reliability function in a microprocessor, as an undetected error could silently corrupt the system's state, with potentially grave consequences. Microprocessors designed for mission critical systems, for servers, etc., invest a large percentage of their area and power budgets for error detection and, when possible, correction to avoid faults from SDC errors. IBM's G4/G5 microprocessors have two identical copies of the pipeline (the I-unit and E-unit), sharing the first-level caches, Which are parity protected. Pipeline errors are detected by comparing the results from the two I- and E-units. The arrays holding the processor state (register files, store buffer) are ECC protected. In case of an uncorrectable or hard error the G5 processor signals the operating system to transfer the state of the failed processor to the dispatch queue of a different processor in the system. The failed processor is taken out of the active configuration and the task it was executing is restarted on the new processor with the proper priority. Duplicating the I- and E-units improves error detection, but at a high price in area and power of about 35% chip area overhead.

Fujitsu's 5th generation SPARC64 microprocessor achieves error detection by using a variety of error detection mechanisms like parity and ECC on the caches, register files, parity prediction and checking for ALUs and shifters, 2-bit residue checker for the multiply/divide unit, etc. Parity check also covers over 80% of the chip's latches, including all data path latches. Error recovery is done by re-issuing (retrying) at commit an instruction that cannot commit due to an error that affected its execution. All of these error detection mechanisms and their checkers sprinkled throughout the chip benefit reliability, but add significant complexity and area to the chip.

The DIVA and the SplitDiva checker architectures not only detect errors in the pipe, but also incorrect results due to design corner cases (those cases of a strange combination of happenings and circumstances that conspire to generate errors). These checker architectures achieve this by providing a checker in addition to the core processor. The checker, which can be simpler and slower than the core processor, executes the same instructions as the core, checks the correctness of these instructions and retries instructions that fail. The checker is also designed to take over the program execution in case of a hard core processor failure, but with poor performance. DIVA delivers error detection and correction (including surviving design corner cases, uncorrectable errors and hard errors), but at a significant cost in area and power.

Run-Ahead Execution (RAE) is a microarchitecture optimization that attempts to prefetch for loads further down the execution path when the processor has a lengthy stall (e.g., a load missing the L2 cache). Though RAE is a performance optimization technique primarily, it also improves the failure rate due to soft errors, because the residence time of data in unprotected registers and flops on the processor core is bounded by the initiation of RAE and consequent flushing on a lengthy stall.

Error detection techniques for existing high reliability microprocessors, suffer from high area and power overhead, and might be overkill for most markets. After EDC is added to caches, the unprotected regular structures (e.g. register files) become some of the most important contributors to the failure rate due to soft errors, while the execution units, which occupy a large portion of each processor core's area, are some of the most important contributors to the hard error rate, and, to a lesser extent, soft error rate.

As discussed above, conventional processors mostly detect errors in random access memory, although there is also a need to detect errors arising from register files, execution units, buffers, etc. One of the most efficient (i.e., low overhead) ways for detecting errors in execution units is with residue checking. Residue checking has been implemented for arithmetic units (adders, multipliers, dividers). Some mainframes (e.g., Amdahl's 5990A and 5990M) use a module 3 (2-bit) residue checker for its multiply/divide unit. More recently, microprocessors, such as Fujitsu's SPARC64 microprocessors, adopted the same technique (also for error detection in the multiply/divide unit). The motivation for employing residue-based error detection for their arithmetic units is 1) that the technology of these microprocessors makes transient errors in those units more probable, and 2) that, in time, hard errors could occur in these units and, if not detected, could result in silent data corruption.

Though conventional techniques protect arithmetic units with residues, these techniques are piece-meal and require inefficiently crossing many protection domains variously protected by parity, ECC and residues. Accordingly, a technique is desired that maximizes error detection (minimum silent data corruption in case of an error) with minimum area overhead and minimum complexity.

SUMMARY

It has been discovered that residue-based error detection provides comprehensive protection for an execution pipeline from end-to-end, including register files, functional units (i.e., execution units) and associated data paths. A residue-based protection scheme can leverage a processor pipeline by delaying error detection until the commit state (or retire stage) of the pipeline, and using existing flush mechanisms to re-execute and correct the detected error, if necessary. Applying residue-based error detection to units/blocks of an execution pipeline protects the entire execution pipeline and eliminates the need to check and compute EDC codes at different protection boundaries. The key property of residue codes utilized in the described invention is that the residue of a correct result must match that obtained directly from the residues of the input operands for the arithmetic operations.

These and other aspects of the described invention will be better described with reference to the Detailed Description and accompanying Figures.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
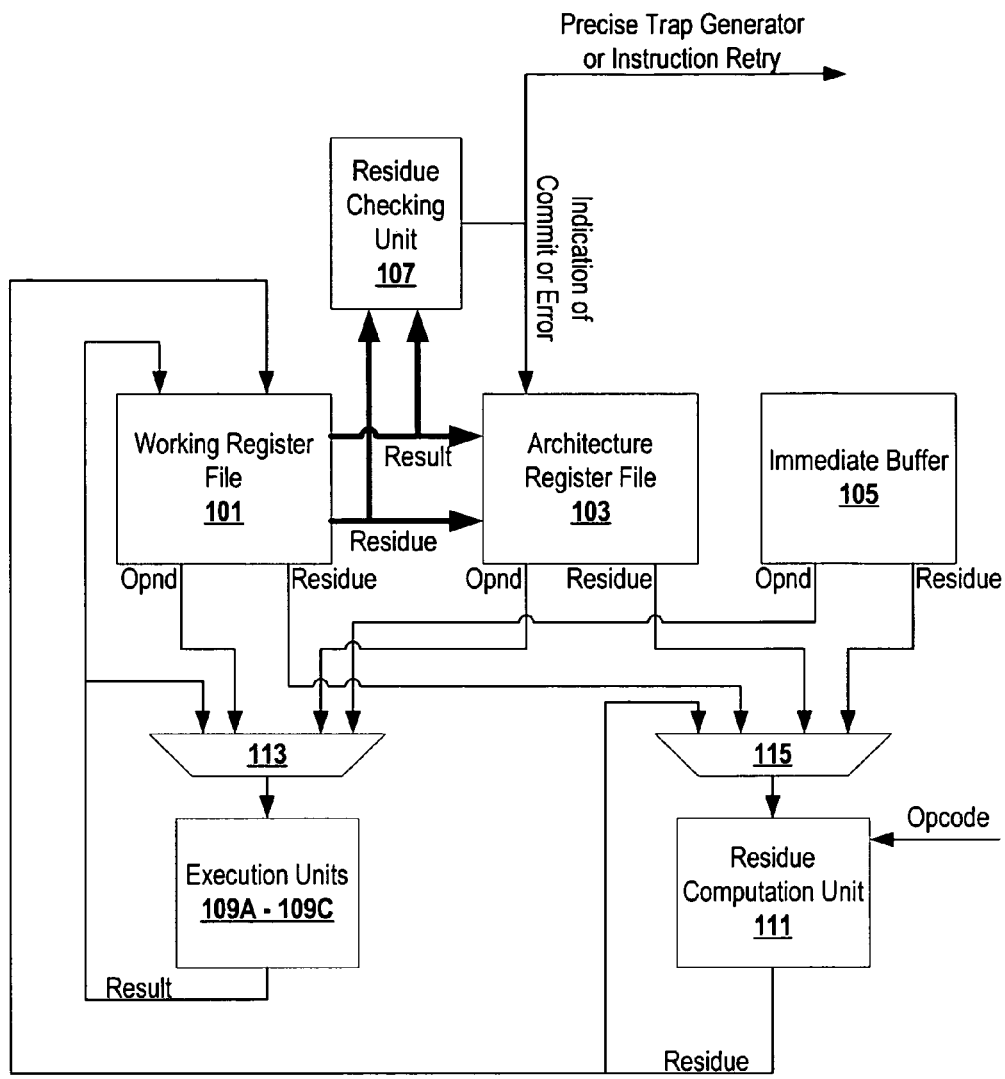
FIG. 1 depicts exemplary units of an execution pipeline and a residue-based error detection infrastructure.

The description that follows includes exemplary systems, methods, techniques, and instruction sequences that embody techniques of the present invention. However, it is understood that the described invention may be practiced without these specific details. For instance, the following description refers to mod-3 residue-based error detection mechanisms, but other parameters, such as larger modulus values (e.g., mod-7), may be utilized. In other instances, well-known protocols, structures and techniques have not been shown in detail in order not to obscure the invention.

In the following description, the terms instruction instance, operands, operand residues, and execution pipeline are utilized. An instruction instance is a specific instance of an instruction. For example, instructions include loads (ld) and stores (st). An instruction instance would be an instance of a load instruction (e.g., ld (r3) r4). An operand is a value utilized in performing an operation. In this description, an operand is typically a result of an already executed instruction instance, thus its residue has already been computed. The already computed residue of an operation is referred to herein as an operand residue. An execution pipeline is the execution stage of an instruction pipeline. Although a stage in the instruction pipeline, the execution stage is itself considered a pipeline since the execution stage can be subdivided into its own stages of read operands, perform operation, and write or update result. Although each of these stages of the execution pipeline is typically a single cycle, either or both of the length of a stage in the execution pipeline and the number of stages in the execution pipeline may vary.

Residues

The mod-D residue of a number N, N mod D, is the positive remainder resulting from the integer division of a signed integer N by an unsigned integer D. Residue-based error detection takes advantage of two properties of residues:

1) For arithmetic operations: (X op Y) mod D=((X mod D) op (Y mod D)) mod D

2) The residue of a number can be used for detecting errors in up to k bits of that number if D is a Merrill number ($D=2^k-1$)

The reason that mod-($2^k-1$) residues can be used to detect a number's bit errors is that the residue calculation uses all of the number's data bits in k-bit groups. This property applies to Merrill numbers only.

The residues usually employed are modulo-($2^k-1$), where k represents the number of residue bits. The ($2^k-1$) number, also known as a Merrill number, is typically employed because it is simpler to calculate the modulo-($2^k-1$) of a value. The more popular residues are 2-bit (modulo-3) and 3-bit (modulo-7) residues, which have lower overhead and are simpler to calculate. The modulo-3 residue has been shown to give good error coverage for arithmetic execution units. A modulo-3 residue can detect not only single-bit errors, but also many 2-bit errors.

To illustrate, calculating the modulo-3 (k=2) residue of a 16-bit value with a hexadecimal representation of 0xb49e begins with grouping bits (bit groups of k=2). The value is represented in base-4 as 23102132. Pairs of the bit groups are added, and the modulo-3 of the sum computed, until the final value is achieved. An equation to represent the generation of the residue may be as follows:

residue=(((2+3)mod 3)+((1+0)mod 3)+((2+1)mod 3)+((3+2)mod 3))mod 3=(((2+1)mod 3)+((0+2) mod 3)mod 3)=(0+2)mod 3=2.

Exemplary Systems

The described residue-based error detection technique can be applied to various systems. For illustrative purposes, a system with a chip multi-threading processor with four out-of-order execution cores is assumed for some of the examples described below. In this illustrative system, each core supports two threads (2-way simultaneous multi-threading (SMT)), for a total of eight threads per chip. A core can issue up to three instructions per cycle out of its instruction window. The two threads of a core share an instruction cache and a data cache (both parity-protected write-through caches), as well as an Integer Execution Unit (IEU) and a Floating Point Unit (FPU).

The register files consist of separate working registers and architectural registers for the integer (IEU) and floating-point (FPU) units. The working registers are shared by the two threads, while each thread has its own architectural registers. The result of an instruction instance, if any, is copied at commit time, from the assigned working register to the proper architectural register. The commit of each instruction instance, including its destination register update, is controlled by the instruction instance's assigned entry in a Commit Queue structure. This entry holds the instruction's relevant information (opcode, destination registers, etc.), as well as information gathered during the instruction's flow through the pipeline (including successful completion, program exception or error, etc.). The Commit Queue (CQ) entries are assigned to instructions, in program order, by a Decoder. CQ also commits instructions in order, as only the oldest instructions in the CQ can conmit in a given clock cycle (and only if the older instruction(s) in this group, if any, is (are) also ready to commit in that cycle).

A branch mispredict, an exception or an error causes the pipe to be cleared, causing all pending instructions to be lost and later retried. An error (as well as most exceptions) could cause a precise trap (i.e. a trap that on return will start execution with the oldest instruction affected by the error). This is the main error recovery mechanism for transient errors in the pipeline, as the pipe clear should cause the storage or logic with the error to re-initialize, eliminating the erroneous value and allowing a successful completion when the instruction with the error is re-executed. The trap service routine is expected to tally the errors for both preventive maintenance reasons (identify components with unusually high error rates) and in order to identify hard errors (an error that is not corrected after causing a predetermined number of error traps is declared a hard error). Errors that cannot be eliminated through pipe clear and instruction re-execution (e.g. the cache errors) have their own correction mechanisms. For example, logic in the write-through Data Cache forces a cache miss in case of a data parity error and generates an interrupt to the proper thread, in order to communicate the error. The interrupt service routine is expected to tally the errors in a fashion similar to the way precise traps tally errors. The cache miss writes correct data from the L2 cache into the cache entry with the error, eliminating the error, if the error is correctable (i.e., the error is transitory).

Residue-Based Protection of an Execution Pipeline

A residue can be used not only as an arithmetic checker, but also as a data checker. Computing residues during the execution stage of an instruction pipeline and delaying residue checking until the commit stage of instruction pipeline, achieves protection of a processor's entire execution pipeline. Protection of the entire execution pipeline includes protecting arithmetic units, as well as regular structures (i.e., registers). If applicable, residue-based error detection is also applied to a buffer holding immediate operands.

FIG. 1 depicts exemplary units of an execution pipeline and a residue-based error detection infrastructure. The depicted execution pipeline units are protected with residues generated by the error detection infrastructure. The units include functional units that perform an arithmetic operation(s) of an instruction instance, and regular structures used to store operands and results of an instruction instance. FIG. 1 depicts a working register file 101, an architectural register file 103, an immediate buffer 105, execution units 109A-109C, a residue computation unit 111, and operand multiplexers 113 and 115. Although the depicted execution pipeline assumes a separate working register file and architecture file, the described invention can be applied to various architectures that may or may not separate registers into a working register file and an architectural register file. For example, a system may tag a value(s) to indicate whether the corresponding instruction instance has been retired/committed.

In FIG. 1, the working register file 101 is coupled to transmit both data (results) and corresponding residues to the architectural register file 103 and to the residue checking unit 107 at commit. Each of the working register file 101, the architectural register file 103, and the immediate buffer 105 (which may or may not be present in various architectures) is coupled to supply operands to multiplexer 113 and coupled to supply operand residues to multiplexer 115. A control signal, which is not illustrated, governs which input the multiplexers 113 and 115 select and supply to the residue computation unit 111 and execution units 109A-109C, respectively. The control signal is generated from a unit that examines instructions instances (e.g., an instruction scheduler) and determines dependencies between instruction instances. If an operand for a current instruction instance is the result of an instruction instance that has been committed, then the control signal will cause the multiplexers 113 and 115 to select input from the architectural register file 103. If an operand for a current instruction instance is the result of an executed but not yet committed instruction instance, then the control signal will cause the multiplexers 113 and 115 to select input from the working register file 101, and similarly for input selected from the immediate buffer 105. If a current instruction instance consumes the result of an immediately preceding instruction instance, then the control signal will cause the multiplexers 113 and 115 to select that result via the bypass for a particular operand.

The execution units 109A-109C are coupled to supply output (results of performing an operation indicated by an instruction instance) to the working register file 101 for storage, as well as for bypass to the multiplexer 113. The residue computation unit 111 is coupled to bypass computed residues to the multiplexer 115 as input and coupled to supply residues to the working register file 101 for storage. As with the execution units 109A-109C, the residue computation unit 111 is also coupled to receive an opcode, which governs the operation(s) to be applied to input received by the residue computation unit 111. For example, if an instruction instance indicates addition of a and b, then the opcode will indicate addition and the corresponding operand residues will be input into the residue computation unit 111. However, the residue computation unit 111 will compute the sum of the residue of a and the residue of b (res(a)+res(b)), and then generate the residue of the sum of the residues. Note that the immediate operand's residue could be generated as soon as the immediate is decoded. The immediate value and its residue are then saved in the proper immediate buffer 105 entry by a decoder.

To generate residues, the residue computation unit 111 includes logic for residue generation, which is also included in the residue checking unit 107. This logic generates/computes a residue from an input value. Exemplary logic for computing residues is depicted in FIG. 2.

Figure 2:
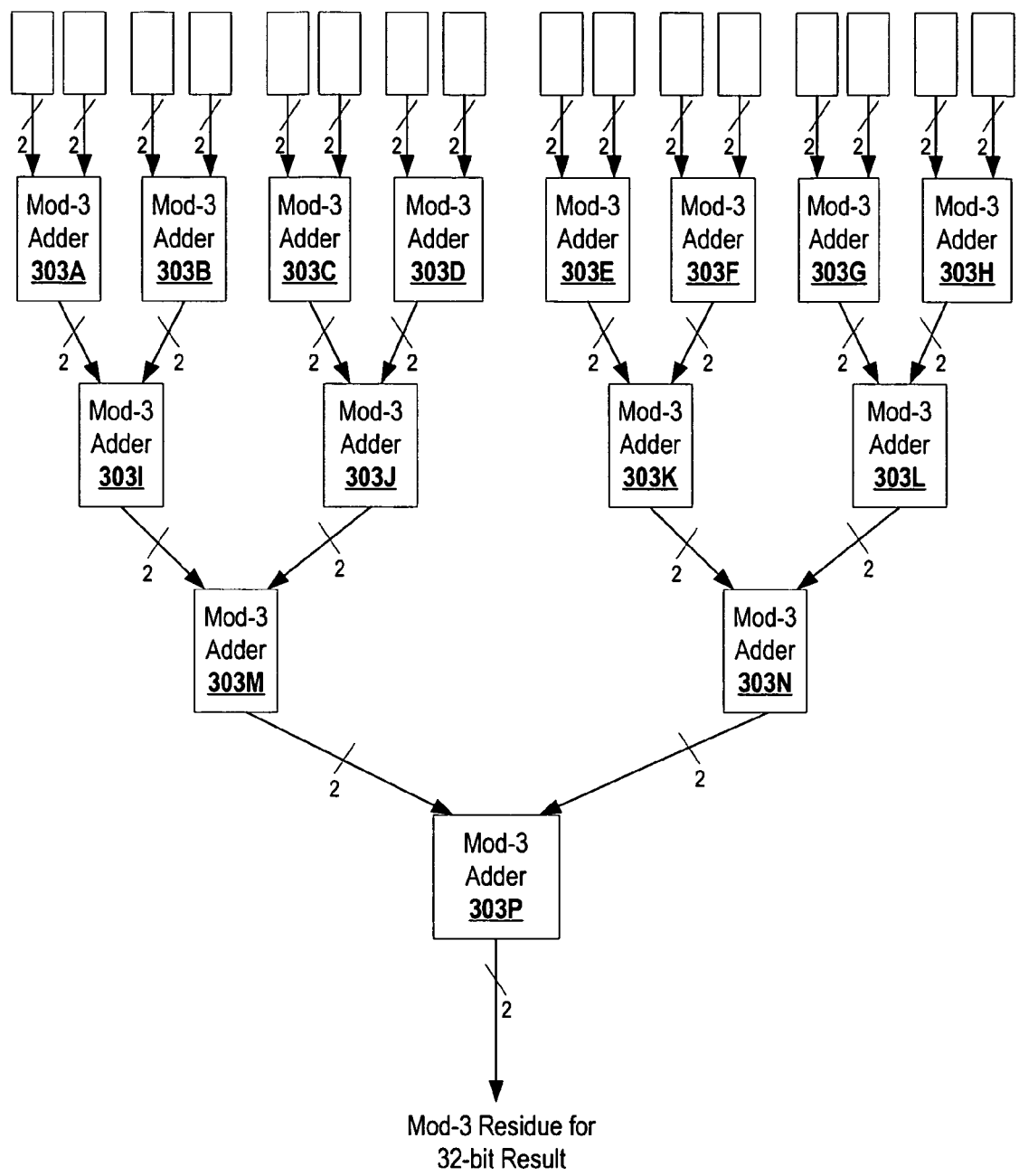
FIG. 2 depicts exemplary logic to generate modulo-3 residues.

FIG. 2 depicts exemplary logic to compute modulo-3 residues. In FIG. 2, a series of storage cells hold a 32-bit value. The storage cells are coupled to supply two 2-bit values to each of modulo-3 adder units 303A-303H. Each of the modulo-3 adder units 303A-303H adds the supplied two bit pairs and computes modulo-3 of the sum. The 2-bit representation of the result is then forwarded to another modulo-3 adder unit. In FIG. 2, the units 303A and 303B supply their output to the modulo-3 adder unit 303I. The remaining units are coupled as follows: 303C and 303D→303J, 303E and 303F→303K, and 303G and 303H→303L. Output flows from 303I and 303J to 303M, and output flows from 303K and 303L to 303N. Both outputs from 303M and 303N flow into the unit 303P, which outputs a mod-3 residue value.

Referring again to FIG. 1, the working register file 101 holds the results of instruction instances flowing through the pipe that have not yet committed. After execution of an instruction instance, the result is stored into the working register file 101 along with the result's corresponding residue. Various techniques may be utilized to maintain an association between a result and its corresponding residue. For example, results and residues may be stored in respective separate physical structures with the same indexing. When an operand stored in entry 1 of the non-residue operand portion of the working register file is selected, the corresponding entry 1 of the residue portion of the working register file 101 is selected. Continuing with the previous example, if the instruction instance indicates that the result is to be stored in entry 3, then the residue will be stored in entry 3 of the residue portion of the working register file 101, while its counterpart (the result) is stored in entry 3 of the non-residue portion of the working register file 101 as indicated by the executed instruction instance.

As described above, when an arithmetic type instruction instance is executed in the execution units 109A-109C, the same operation(s) of the instruction instance is also applied in the residue computation unit 111, to the corresponding operand residues. When the instruction instance is committed, the result of the committed instruction instance and its corresponding residue are copied from the working register file 101 to the architectural register file 103 if residue checking succeeds. Before data is written to the architectural register file 103, the data (result and corresponding residue) is sent to the residue checking unit 107, which check for errors. The residue checking unit 107 receives the result and computes a residue for the received result. After computing a residue for the result, the residue checking unit 107 compares the computed result derived result residue with the corresponding received residue derived result residue to determine whether any errors have appeared. The residue checking unit 107 outputs an indication of either commit or error to the architectural register file 103 (or to a gate preceding the architectural register file 103), which controls whether the data forwarded from the working register file 101 is written to the architectural register file 103. If an error is detected, it is possible to recover from the error since the result has not yet been committed (i.e., architectural state has not been updated).

Various mechanisms can be employed for error recovery, such as a trap handling mechanism. For example, assume a current instruction instance is marked in the commit queue as having an error. The error triggers a precise trap at commit.

The precise trap is serviced by a service routine after all instruction instances prior to the current instruction instance have retired. This precise trap's service routine tallies the error for further statistical analysis and initiates a re-execution of the instruction instance. If the original error was due to a soft error in the working register file 101 or execution units 109A-109C, then the re-execution clears the error because the working register file 101 and the execution units 109A-109C are re-initialized when the pipeline is cleared as part of handling the trap. If the re-execution also fails, the error may be due to an uncorrectable error (hard error) in the architectural register file 103. In order to overcome this hard error, the software might choose to move the failing core's state to another core.

Although ECC codes may be employed in the architectural register file 103 for correction of errors in the architectural register file, residues are used for error detection in the architectural register file 103 as well as the working register file 101 and execution units 109A-109C. For single-bit architectural register file errors, including hard errors, there is no failure. However a single-bit architectural register file hard error could result in a significant performance degradation due to repeated traps, which can be addressed with failover to another core.

The address of loads and stores, as well as the address of branches, are also calculated by the execution units 109A-109C, but are not saved in the working register file 101. For loads and stores, the residue accompanies the address and can be used, as part of the cache access, for checking the address correctness. For branches the target address correctness is checked at commit, as part of the program counter update.

As shown in FIG. 1, the working register file 101, the architectural register file 103, and the immediate buffer 105, hold not only the non-residue values (non-residue operands and results), but also their corresponding residues. Storing both a result and a residue thereof avoids calculating the residues for the result before execution time, saving gate delays and area. Most processors today use parity to detect errors in the working register file, the architectural register file, and the immediate buffer. Such a parity protection mechanism requires a parity checker for each operand to the arithmetic execution units, and a residue generator for each operand to the execution units that use residues for error detection, usually in a multiplier/divider. Storing both the result of executing an instruction instance and the corresponding residue allows any error in any one of the input operand for the instruction instance, the result of the executed instruction instance, or the residue to be detected at commit time as described above, without the need for extra checkers. If the error is transient, the processor will recover from it. Applying residue-based protection also allows detection of design corner cases, and in some cases, recovery, because the execution units and the residue computation unit use different logic for most arithmetic operations. As depicted in FIG. 1, the arithmetic execution units and the residue computation unit use different data paths and, in most cases, different control paths.

In high speed processors, the result and the corresponding residue are usually saved in different structures because the residue is calculated, in many cases, one cycle or two after the instruction instance execution result is computed. However, the stages of the execution pipeline can be engineered in various ways to change the time between computation of a result and computation of a corresponding residue (e.g., the computations may be staggered so that the residue computation begin one or more stages after the computation of the result, the computations may be in parallel, etc.).

The described residue-based error detection mechanism replaces parity as the error detection mechanism for register files. This not only improves error detection (two bit errors are also detected), but also allows end-to-end coverage, using residues, of both the register files and the corresponding execution units. As a result, the power and area overhead of the error detection mechanism is kept to a minimum, by eliminating a lot of the intermediate error checking overhead existing in other solutions that mix parity with residues, etc. This end-to-end error detection also has minimal performance impact. The low overhead makes execution unit error detection (and, for soft errors, correction) convenient for most processors.

Residue-Based Protection for Single Instruction Multiple Data Execution

Residue-based protection of a pipeline is applicable to both basic type instructions and single instruction multiple data type instructions, such as the Intel® MMX instructions. A residue-based error detection infrastructure can accommodate varying sizes of operands and computes residues at a granularity that can be the smallest operand size supported by an architecture, although the smallest operand size might not be necessary. An implemented infrastructure may compute residues to the smallest data size that cannot tolerate errors. For example, if a 64-bit architecture supports operations on 8-bit data, 16-bit data, and 32-bit data, then the residue-based error detection infrastructure protects each 8-bit field in a register. However, if operations on 8-bit data are limited to applications that can tolerate errors (e.g., graphics applications), then the infrastructure can be set to protect each 16-bit field in a register. As an example, if the SIMD instructions' data sizes are 8-bits, 16-bits, and 32-bits, and the full size is 64-bits, then the number N could be expressed as:

$$N=2^{56}*N7+2^{48}*N6+2^{40}*N5+2^{32}*N4+2^{24}*N3+2^{16}*N2+2^{8}*N1+N0$$

where N7 to N0 are the 8-bit SIMD data, $2^{8}*N7+N6$ to $2^{8}*N1+N0$ are the 16 bit SIMD data, $2^{24}*N7+2^{16}*N6+2^{8}*N5+N4$ and $2^{24}*N3+2^{16}*N2+2^{8}*N1+N0$ are the 32 bit SIMD data, and N is the full number. As discussed above, the residues for the unsigned numbers are initially calculated and then adjusted as necessary. For example, a mod-3 residue for all the SIMD data sizes and for the full size data is calculated as follows:

$N \bmod 3=((2^{56} \bmod 3)*(N7 \bmod 3)+(2^{48} \bmod 3)*(N6 \bmod 3)+(2^{40}_{mod} 3)*(N5 \bmod 3)+(2^{32} \bmod 3)*(N4 \bmod 3)+(2^{24} \bmod 3)*(N3 \bmod 3)+(2^{16} \bmod 3)*(N2 \bmod 3)+(2^{8} \bmod 3)*(N1 \bmod 3)+(N0 \bmod 3))\bmod 3$ which gives:

$N \bmod 3=((N7 \bmod 3)+(N6 \bmod 3)+(N5 \bmod 3)+(N4 \bmod 3)+(N3 \bmod 3)+(N2 \bmod 3)+(N1 \bmod 3)+(N0 \bmod 3))\bmod 3$.

It can be seen from the above equation that, for mod 3 residues, the unsigned residue of the full size data and the smaller SIMD data can be calculated by adding, mod 3, the residues of the smaller size SIMD data with the same bits. Once the proper residues are calculated, they can be adjusted for the sign based on the data type (SIMD type or full size).

Figure 3:
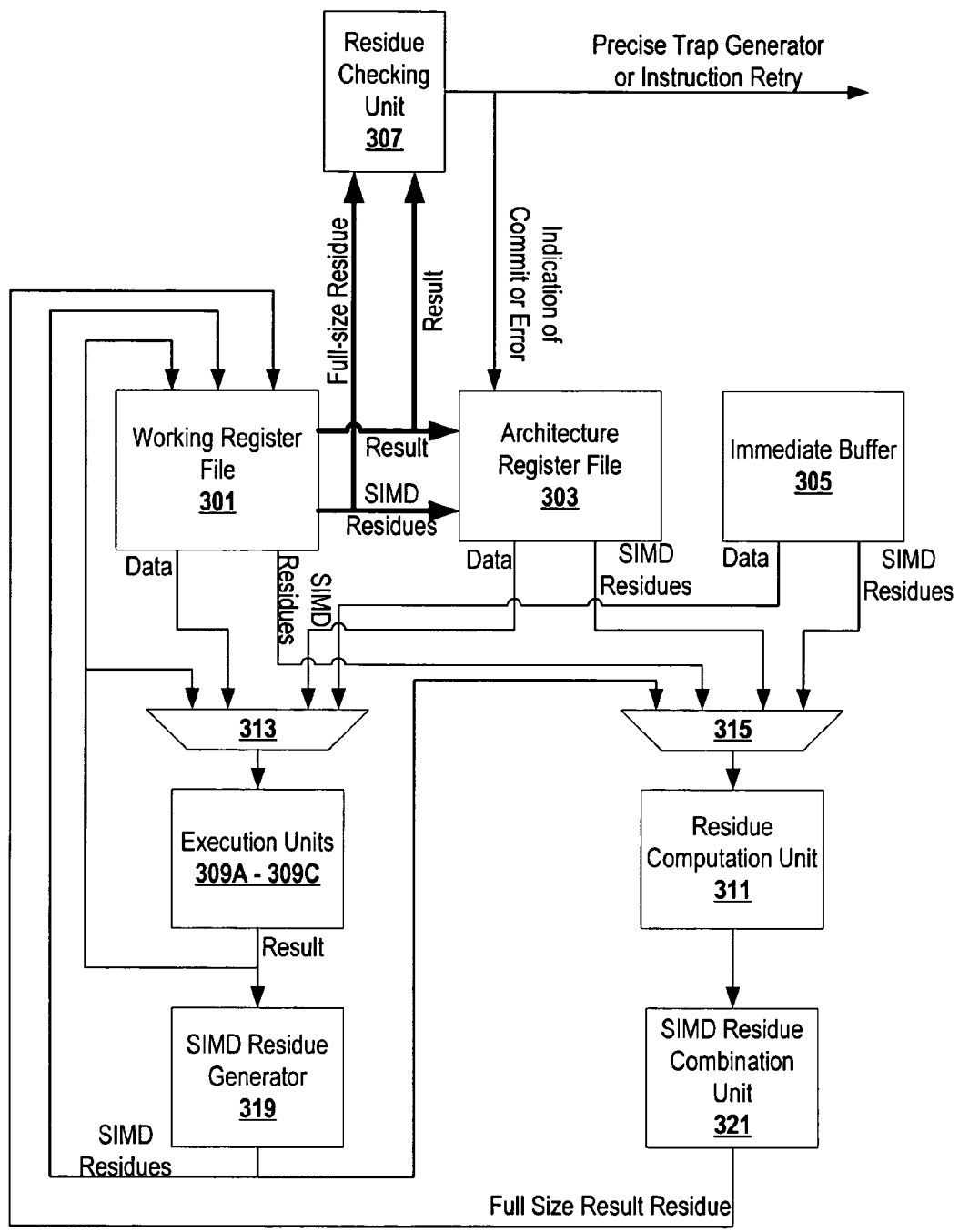
FIG. 3 depicts exemplary blocks of a processing unit for residue-based protection for SIMD instruction instances.

FIG. 3 depicts exemplary blocks of a processing unit for residue-based protection for SIMD instruction instances. Similar to FIG. 1, FIG. 3 includes a working register file 301, an architectural register file 303, an immediate buffer 305, a residue checking unit 307, execution units 309A-309C, and a residue computation unit 311. However, FIG. 3 also depicts a SIMD residue generator 319 and a SIMD residue combination unit 321. When an instruction instance is executed by one of the execution units 309A-309C, the result is stored at the appropriate entry in the working register file 301, and input into the SIMD residue generator unit 319. The SIMD residue generator 319 generates residues for a particular data size (i.e., the smallest supported data size, smallest supported data that cannot tolerate errors, etc.). For example, assume one of the execution units 309A-309C outputs a 64-bit result to the SIMD residue generator 319, and the select data size for the residue-based error detection mechanism is 16-bits. The SIMD residue generator 319 will generate residues for each 16-bit group of the 64-bit result (i.e., 4 residues), assuming mod-3 (2 bit) residues. These SIMD residues will then be stored in the appropriate entry in the working register file 301 (the appropriate entry being the entry in the residue portion of the working register file 301 that corresponds to the entry of the non-residue portion of the working register file 301 that hosts the computed result.

In parallel with the execution of the instruction instance, the residue computation unit 311 performs the operation(s) for the instruction instance being executed on SIMD residues that correspond to the operands input into the executing one of the execution units 309A-309C. For example, assume the instruction instance indicates a 32-bit SIMD operation with a 16-bit data size selected for error detection. Residues for the 16-bit SIMD operands will be input into the residue computation unit 311. The residues for the proper 16-bit groups will be combined to generate residues for the each 32-bit operand of the instruction instance being executed. The indicated operation(s) is then performed on the combined residues to generate residues for each 32-bit group. The two residues for the 32-bit groups are then input into the SIMD residue combination unit 321 to generate a residue for the 64-bit result. The residue for the full size result is stored in the appropriate entry of the working register file 301. This full size residue is the residue utilized for residue checking by the residue checking unit 307 at commit. Note that the immediate buffer 305 is not used, in most architectures, for SIMD operations. As a result, the immediate buffer 305 could be protected with one (max immediate size) residue (no need for multiple SIMD residues).

As with FIG. 1, at commit time the result of the executed instruction instance and the corresponding residue for the full size result are copied from the proper working register file 301 entry to the destination architectural register file 303 entry for that instruction instance, contingent upon successful residue checking. The residue checking unit 307 computes a residue from the result, and compares the currently computed residue with the previously computed residue. Although the residue for the result could have been computed immediately after computation of the result, the computation of the residue from the result is delayed until commit to allow detection of errors in the working register file 301 entry that occur between the time the result from executing the instruction instance is generated to commit. Realizations may combine the previously generated SIMD residues instead of the result for comparison against the residue computed from residues if the exposure of using the SIMD residues is acceptable. Typically such exposure is small, and the error will be captured on a dependent instruction instance.

Errors in the architectural register file 303 can be recovered by also calculating data ECC when transferring data from the working register file 301 to the architectural register file 303. Utilization of the ECC is limited to architectural register recovery and is not involved in protection of the pipeline.

Figure 4:
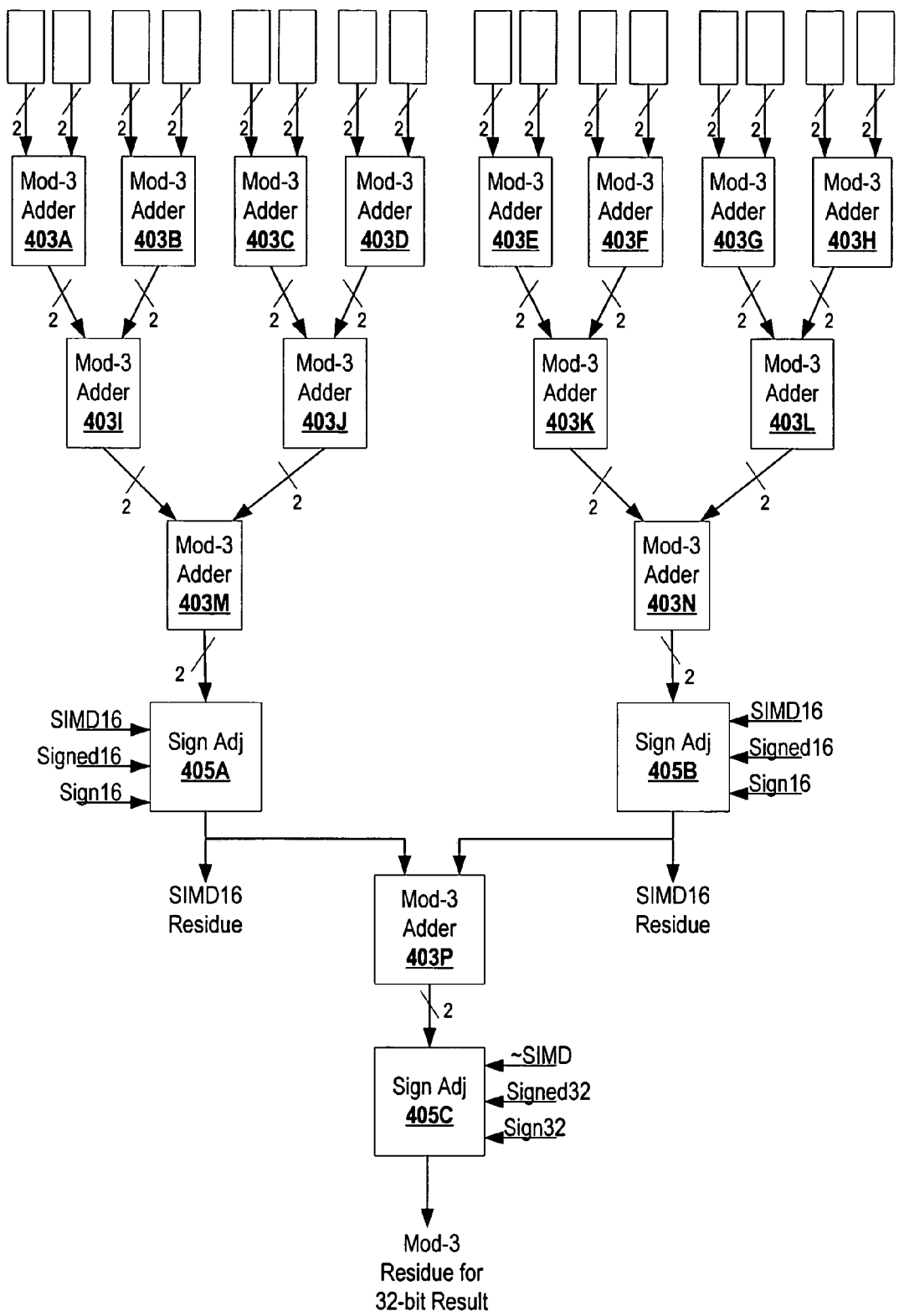
FIG. 4 depicts exemplary logic for computing residues for full size data and partial data.

FIG. 4 depicts exemplary logic for computing residues for full size data and partial data. The residue computation unit depicted in FIG. 4 computes mod 3 residues. This residue computation unit computes mod 3 residues for 32-bit data and also generates partial (SIMD) residues (16-bit). To avoid obfuscating the invention, intermediate latching elements that might be necessary for timing reasons have not been depicted. It can be seen in FIG. 4 that sign adjustments are applied after residues are computed. For mod 3 residues, the sign adjustment is pretty simple, as the adjusted residue is $((2^{2m}$ mod 3)−unsigned residue) mod 3=(1−unsigned residue) mod 3=(4−unsigned residue) mod 3 (for 8 bit residues m=4, for 16 bit residues m=8, etc.). The instruction type governs the result's data type and, as a result, the calculation of the instruction instance result residue. The instruction type is also available as part of the commit, in order to determine how the full size (32-bit in our case) residue used for checking is generated.

Based on the instruction type, the residue computation unit depicted in FIG. 4 generates the proper SIMDx and Signedx signals (where x is 8, 16 and 32 for a 64-bit data). In FIG. 4, the x is 16. The SIMDx signals indicate if the instruction instance is a SIMD instruction or not and, if SIMD, the data size operated on by the instruction instance. Whenever any one of the SIMDx signals is asserted, the SIMD signal in the last stage should be unasserted. For example, for a 16-bit SIMD instruction, SIMD16 should be asserted, while all the other SIMD signals, including the SIMD signal at the last stage, should be unasserted (the SIMD signal should be unasserted to indicate that the instruction instance is a SIMD instruction, so no sign adjustment should be made for the full size data). In this example, if Signed16 is asserted for a given 16-bit data, its residue is adjusted as a function of the sign (Sign16) of that 16-bit group as described above (no change if the Sign16 bit for that 16 bit data is zero; (4−unsigned residue) mod 3 if the Sign16 bit for that 16 bit data is one). Otherwise, this is an unsigned number and a sign adjustment is not needed. As SIMD is unasserted, the final residue is calculated as unsigned. In FIG. 4, each of the mod-3 adder units 403A-403H are coupled to each receive two 2-bit values, which are added and then a modulo-3 operation is applied to the sum. As in FIG. 3, there are two more successions of mod-3 adder units that further reduce the output of the preceding set of mod-3 adder units. The mod-3 adder units 403I-403L are coupled to the first set of mod-3 adder units 403A-403H. The third set of mod-3 adder units 403M and 403N are coupled to receive the output of the mod-3 adder units 403I-403L. Sign adjust units 405A-405B are respectively coupled to receive output from the mod-3 adder units 403M and 403N. The sign adjust units 405A-405B operate in accordance with signals SIMD16, Signed16, and Sign16. Each of the sign adjust units 405A-405B generate a residue for a 16-bit value. In addition, the output of the sign adjust units 405A-405B flow into a mod-3 adder unit 403P. A final adjust unit 405C is coupled to receive output from the mod-3 adder unit 403P. The adjust unit 405C processes the mod-3 adder unit 403P output in accordance with signals ~SIMD, Signed32, and Sign32. The sign adjust unit 405C outputs a residue for a 32-bit value.

For a full size (non-SIMD) instruction type, the residue computation unit asserts only the SIMD signal and unasserts the SIMD16 signal. The Signed32 signal is also generated to indicate if this is a signed or unsigned 32-bit operation (the other Signed16 signal could also be generated, but they have no effect if the corresponding SIMD16 is unasserted). As a result, all of the partial (SIMD) residues are calculated as unsigned data and only the 32-bit residue is adjusted as a function of Signed32 and Sign32 signal values.

Protecting multiple units/blocks (e.g., execution units and storage units) of a processor pipeline with a single protection scheme eliminates the overhead due to transitioning from one type of error detection to another. By using the same type of residue for the execution units and the register files, and by comparing the residues at commit, complexity of error detection is substantially reduced.

The described invention may be provided as a computer program product, or software, that may include a machine-readable medium having stored thereon instructions, which may be used to program a computer system (or other electronic devices) to perform some or all of the functionality described above. A machine readable medium includes any mechanism for storing or transmitting information in a form (e.g., firmware) readable by a machine (e.g., a computer). A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

Figure 5:
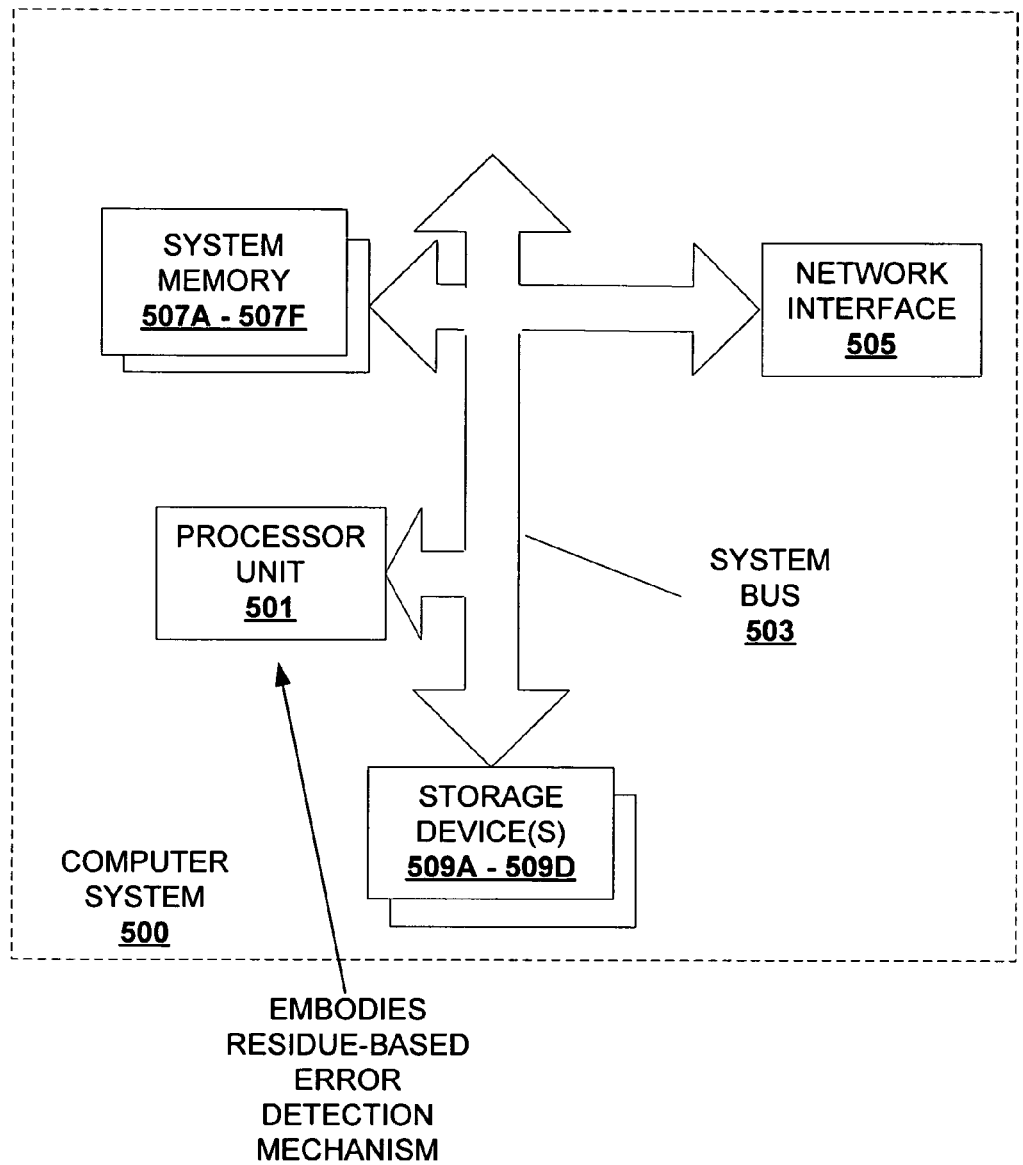
FIG. 5 depicts an exemplary computer system according to realizations of the invention.

FIG. 5 depicts an exemplary computer system according to realizations of the invention. A computer system 500 includes a processor unit 501 (possibly including multiple processors). The computer system 500 also includes a main memory 507A-507F (e.g., one or more of cache, SDRAM, RDRAM, EDO RAM, DDR RAM, EEPROM, etc.), a system bus 503 (e.g., LDT, PCI, ISA, etc.), a network interface 505 (e.g., an ATM interface, an Ethernet interface, a Frame Relay interface, etc.), and a storage device(s) 509A-509D (e.g., optical storage, magnetic storage, etc.). Realizations of the invention may include fewer or additional components not illustrated in FIG. 5 (e.g., video cards, audio cards, additional network interfaces, peripheral devices, etc.). The processor unit 501, the storage device(s) 509A-509D, the network interface 505, and the main memory 507A-507F are coupled to the system bus 503. The processor unit 501 includes a residue-based error detection mechanism. In some realizations of the invention, some functionality of the residue-based error detection may be embodied in the main memory 507A-507F.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. For example, functionality may be separated or combined in blocks differently in various realizations of the invention or described with different terminology.

These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

An end-to-end residue-based protection scheme for an execution pipeline achieves good error detection with minimal overhead and minimal impact to performance, and without the complexity and cost of having multiple protection schemes for the execution pipeline. The residue-based protection scheme protects multiple units/blocks of an execution pipeline, thus achieving end-to-end protection of the pipeline. Such a residue-based protection scheme not only detects errors in the arithmetic execution units, but also protects data in the registers. Error detection is delayed until commit time, before the update of a processor's state. Coincident with the instruction instance arriving at commit, a residue is computed directly from the result, and this residue is compared against the previously computed corresponding residue, in order to detect any errors in the instruction instance's execution pipeline.

What is claimed is:

1. A method for detecting an error in an execution pipeline of a processor, comprising:
   obtaining a first result after executing a first instruction instance, wherein the first result comprises a first plurality of bits;
   partitioning the first plurality of bits into a first plurality of groups, wherein each of the first plurality of groups comprises a subset of consecutive bits of the first plurality of bits;
   calculating a first plurality of residues for the first plurality of groups, wherein each of the first plurality of residues corresponds to one of the first plurality of groups;
   storing the first result, a full size residue of the first result, and the first plurality of residues in a working register file (WRF);
   summing the first plurality of residues to generate a first sum after storing the first result in the WRF;
   calculating a residue of the first sum;
   comparing the residue of the first sum and the full size residue of the first result to generate a first comparison; and
   detecting the error based on the first comparison.

2. The method of claim 1, further comprising:
   incrementing a count associated with the error;
   re-executing the first instruction instance to generate a second result, wherein the second result comprises a second plurality of bits;
   partitioning the second plurality of bits into a second plurality of groups;
   calculating a second plurality of residues for the second plurality of groups;
   summing the second plurality of residues to generate a second sum;
   calculating a residue of the second sum; and
   comparing the residue of the second sum and a full size residue of the second result to generate a second comparison.

3. The method of claim 2, further comprising:
   detecting the error based on the second comparison;
   incrementing the count in response to detecting the error based on the second comparison; and
   classifying the error as a hard error after incrementing the count, wherein the count exceeds a predefined threshold.

4. The method of claim 2, further comprising:
classifying the error as a soft error, wherein the error is not detected by the second comparison, and wherein the count is below a predefined threshold.

5. The method of claim 1, wherein a size of the first plurality of bits is 64 bits and wherein a size of each of the first plurality of groups is 16 bits.

6. The method of claim 1, wherein a size of the first plurality of bits is 64 bits and wherein a size of each of the first plurality of groups is 32 bits.

7. The method of claim 1, further comprising:
committing the first result and the first plurality of residues to an architecture register file (ARF) after correcting the error;
executing a second instruction instance to generate a second result after committing the first result to the ARF, wherein the first result is a first operand of the second instruction instance;
calculating a residue of the first operand by summing the first plurality of residues;
obtaining a residue of a second operand of the second instruction instance;
calculating a full size residue of the second result based on the residue of the first operand and the residue of the second operand.

8. The method of claim 7, wherein a size of each of the first plurality of groups is 8 bits and wherein the second instruction instance is a 64-bit operation.

9. An apparatus for detecting an error, comprising:
an execution unit for generating a first result by executing a first instruction instance, wherein the first result comprises a first plurality of bits;
a residue generator operatively connected to the execution unit and configured to partition the first plurality of bits into a first plurality of groups and calculate a first plurality of residues for the first plurality of groups;
a working register file (WRF) operatively connected to the execution unit and the residue generator and configured to store the first result, a full size residue of the first result, and the first plurality of residues; and
a residue checking unit operatively connected to the WRF and configured to sum the first plurality of residues to generate a first sum, calculate a residue of the first sum, compare the residue of the first sum and the full size residue of the first result to generate a first comparison, and detect the error based on the first comparison.

10. The apparatus of claim 9, wherein the execution unit is further configured to re-execute the first instruction instance to generate a second result, wherein the second result comprises a second plurality of bits.

11. The apparatus of claim 10, wherein the residue generator is further configured to partition the second plurality of bits into a second plurality of groups and calculate a second plurality of residues for the second plurality of groups.

12. The apparatus of claim 11, wherein the residue checking unit is further configured to sum the second plurality of residues to generate a second sum, calculate a residue of the second sum, and compare the residue of the second sum and a full size residue of the second result to generate a second comparison.

13. The apparatus of claim 9, wherein a size of the first plurality of bits is 64 bits and wherein a size of each of the first plurality of groups is 16 bits.

14. The apparatus of claim 9, wherein a size of the first plurality of bits is 64 bits and wherein a size of each of the first plurality of groups is 32 bits.

15. The apparatus of claim 9, wherein the execution unit is further configured to execute a second instruction instance to generate a second result, wherein the first result is a first operand of the second instruction instance.

16. The apparatus of claim 15, further comprising:
an architecture register file (ARF) operatively connected to the WFR and configured to store the first result and the first plurality of residues after committing the first result and the first plurality of residues;
a residue computation unit operatively connected to the ARF and configured to calculate a residue of the first operand by summing the first plurality of residues; and
a residue combination unit operatively connected to the residue computation unit and configured to calculate a full size residue of the second result based on the residue of the first operand.

17. The apparatus of claim 16, wherein a size of each of the first plurality of groups is 8 bits and wherein the second instruction instance is a 64-bit operation.

* * * * *